(12) United States Patent
Momtahan et al.

(10) Patent No.: US 8,410,419 B2
(45) Date of Patent: Apr. 2, 2013

(54) OPTICAL NAVIGATION DEVICE WITH ILLUMINATION OPTICS HAVING AN IMAGE OUTSIDE A DETECTOR FIELD OF VIEW

(75) Inventors: Omid Momtahan, San Jose, CA (US); Michael John Brosnan, Fremont, CA (US)

(73) Assignee: Avago Technologies ECBU IP (Singapore) Pte. Ltd., Singapore (SG)

( * ) Notice: Subject to any disclaimer, the term of this patent is extended or adjusted under 35 U.S.C. 154(b) by 734 days.

(21) Appl. No.: 12/614,305

(22) Filed: Nov. 6, 2009

(65) Prior Publication Data
US 2011/0108713 A1    May 12, 2011

(51) Int. Cl.
*H01J 40/14* (2006.01)
(52) U.S. Cl. ........................ 250/221; 250/216
(58) Field of Classification Search .................. 250/221, 250/208.1, 216, 239, 559.29–559.32; 345/156–166; 356/376
See application file for complete search history.

(56) References Cited

U.S. PATENT DOCUMENTS

| | | | |
|---|---|---|---|
| 7,019,733 B2 | 3/2006 | Koay | |
| 7,071,923 B2 | 7/2006 | Wang et al. | |
| 7,161,582 B2 * | 1/2007 | Bathiche et al. | 345/156 |
| 7,333,083 B1 | 2/2008 | Theytaz et al. | |
| 7,755,604 B2 * | 7/2010 | Trisnadi et al. | 345/156 |
| 2008/0117439 A1 | 5/2008 | Leong et al. | |
| 2008/0158540 A1 | 7/2008 | Dolfi et al. | |

* cited by examiner

*Primary Examiner* — Que T Le

(57) ABSTRACT

An optical navigation device includes an image sensor, a light source, and illumination optics. The image sensor generates images of a tracking surface. The image sensor has a field of view via imaging optics interposed between the image sensor and the tracking surface. The light source generates light to illuminate a portion of the tracking surface. The illumination optics are interposed between the light source and the tracking surface to direct the light from the light source toward the tracking surface. The illumination optics include an output surface with a primary region illuminated above a threshold intensity. The illumination optics are located relative to the tracking surface so that an image of the output surface excludes the primary region from the field of view of the image sensor.

20 Claims, 9 Drawing Sheets

OPTICAL NAVIGATION DEVICE WITH ILLUMINATION OPTICS HAVING AN IMAGE OUTSIDE A DETECTOR FIELD OF VIEW

BACKGROUND

Optical mice are commonly used as navigation input devices for computers. Typically, the useful light intensity that is used in optical mice for tracking on a glass surface is very low. Thus, even a small amount of noise or crosstalk can negatively impact the ability to distinguish surface features. One source of crosstalk is light scattered from imperfections in output facets, or surfaces, of the illumination optics (e.g., lenses) between the light source and the glass surface. For example, the finite surface roughness of the output facets of a lens module causes light to scatter in almost all directions. Also, the accumulation of dust and dirt on those surfaces contributes to the light scattering and crosstalk.

FIG. 1A depicts a schematic diagram of a conventional optical navigation device 10. The conventional optical navigation device 10 includes a light source 12 and illumination optics 14. The illumination optics 14 have at least one output surface 16 where the light exits the illumination optics 14. This is the surface at which light can scatter due to optical imperfections and/or accumulation of dust. The conventional optical navigation device 10 also includes an image sensor 18, imaging optics 20 (i.e., a lens), and an imaging aperture structure 22 to define an imaging aperture 24. In operation, these components are arranged relative to a tracking material 26 (e.g., glass) with a thickness, L. The tracking material 26 has at least a primary interface 27 (e.g., the top surface) which is used as a tracking surface. The illustrated tracking material 26 also includes a secondary surface 28 that may impact the performance of the optical navigation device 10. Many types of glass tracking materials have both primary (i.e., front) and secondary (i.e., back) surfaces 27 and 28 that reflect light from the light source 12 toward the image sensor 18.

In general, the illumination optics 14 direct light from the light source 12 toward the tracking surface 27. The combination of the image sensor 18, the imaging optics 20, and the imaging aperture 24 forms a unique field of view, β, through which the image sensor 18 generates navigation images of the tracking surface 27. For convenience, this field of view (FOV) is generally designated as the field of view of the image sensor 18. Also for reference purposes, a reference origin 30 is shown at approximately the center of the field of view of the image sensor 18 at the tracking surface 27. Also for reference purposes, although the field of view is a solid angle in the three-dimensional space, for simplicity only a two-dimensional cross section of that angle is shown in FIG. 1A.

Unfortunately, because of the reflective properties of the tracking surface 27, the navigation images generated by the image sensor 18 can also include noise that interferes with accurate tracking operations. Specifically, the image sensor 18 can detect one or more images 32 and 34 of the light scattering that occurs at the output surface 16 of the illumination optics 14. The upper image 32 is referred to as a primary image because it is formed by reflections from the primary surface 27, while the lower image 34 is referred to as a secondary image because it is formed by reflections from the secondary surface 28.

FIGS. 1B and 1C depict top views of the fields of view of the conventional optical navigation device 10 of FIG. 1A at approximately the primary image 32 corresponding to the primary surface 27 of the tracking material 26 and the secondary image 34 corresponding to the secondary surface 28 of the tracking material 26, respectively. These illustrations show the approximate locations of the light source 12, the image sensor 18, the imaging optics 20, and the reference origin 30. The primary and secondary images 32 and 34 are shown with emphasis on an area 36 that has an intensity above a threshold intensity. A portion 38 (shown hashed) of the area 36 of the primary image 32 overlaps with the field of view 38 of the image sensor 18, and all of the area 36 of the secondary image 34 overlaps with the field of view 38 of the image sensor 18. The detection of one or both of these images 32 and 34 by the image sensor 18 can have detrimental effects on the ability of the optical navigation device 10 to perform navigation operations because these images 32 and 34 make it more difficult to distinguish features of the tracking surface 27 in the resulting navigation images generated by the image sensor 18.

SUMMARY

Embodiments of an optical navigation device are described. In one embodiment, the optical navigation device includes an image sensor, a light source, and illumination optics. The image sensor generates images of a tracking surface. The image sensor has a field of view via imaging optics interposed between the image sensor and the tracking surface. The light source generates light to illuminate a portion of the tracking surface within the field of view of the image sensor. The illumination optics are interposed between the light source and the tracking surface to direct the light from the light source toward the portion of the tracking surface within the field of view of the image sensor. The illumination optics include an output surface with a primary region of the output surface illuminated above a threshold intensity. The illumination optics are located relative to the tracking surface so that an image of the output surface is located to exclude the primary region from the field of view of the image sensor.

In another embodiment, the optical navigation device includes an image sensor and illumination optics. The image sensor generates images of a tracking surface. The image sensor has a field of view inclusive of at least a portion of the tracking surface. A restricted region reflecting away from the tracking surface substantially corresponds to the field of view of the image sensor. The illumination optics direct light from a light source toward the tracking surface. A primary region of an illuminated output surface is illuminated above a threshold intensity and located outside of the restricted region so that an image of the output surface relative to the tracking surface excludes the primary region from the field of view of the image sensor. Other embodiments of the optical navigation device are also described.

Embodiments of a method are also described. In one embodiment, the method is a method for operating an optical navigation device. An embodiment of the method includes generating light from a light source. The method also includes directing the light via illumination optics toward a tracking surface. The illumination optics includes an output surface, and a primary region of the output surface is illuminated above a threshold intensity. The method also includes using an image sensor to generate a navigation image of the tracking surface. The image sensor has a field of view inclusive of the tracking surface. The illumination optics are located relative to the tracking surface so that an image of the output surface is located to exclude the primary region from the field of view of the image sensor. Other embodiments of the method are also described.

Other aspects and advantages of embodiments of the present invention will become apparent from the following detailed description, taken in conjunction with the accompanying drawings, illustrated by way of example of the principles of the invention.

BRIEF DESCRIPTION OF THE DRAWINGS

Throughout the description, similar reference numbers may be used to identify similar elements.

DETAILED DESCRIPTION

Figure 1A:
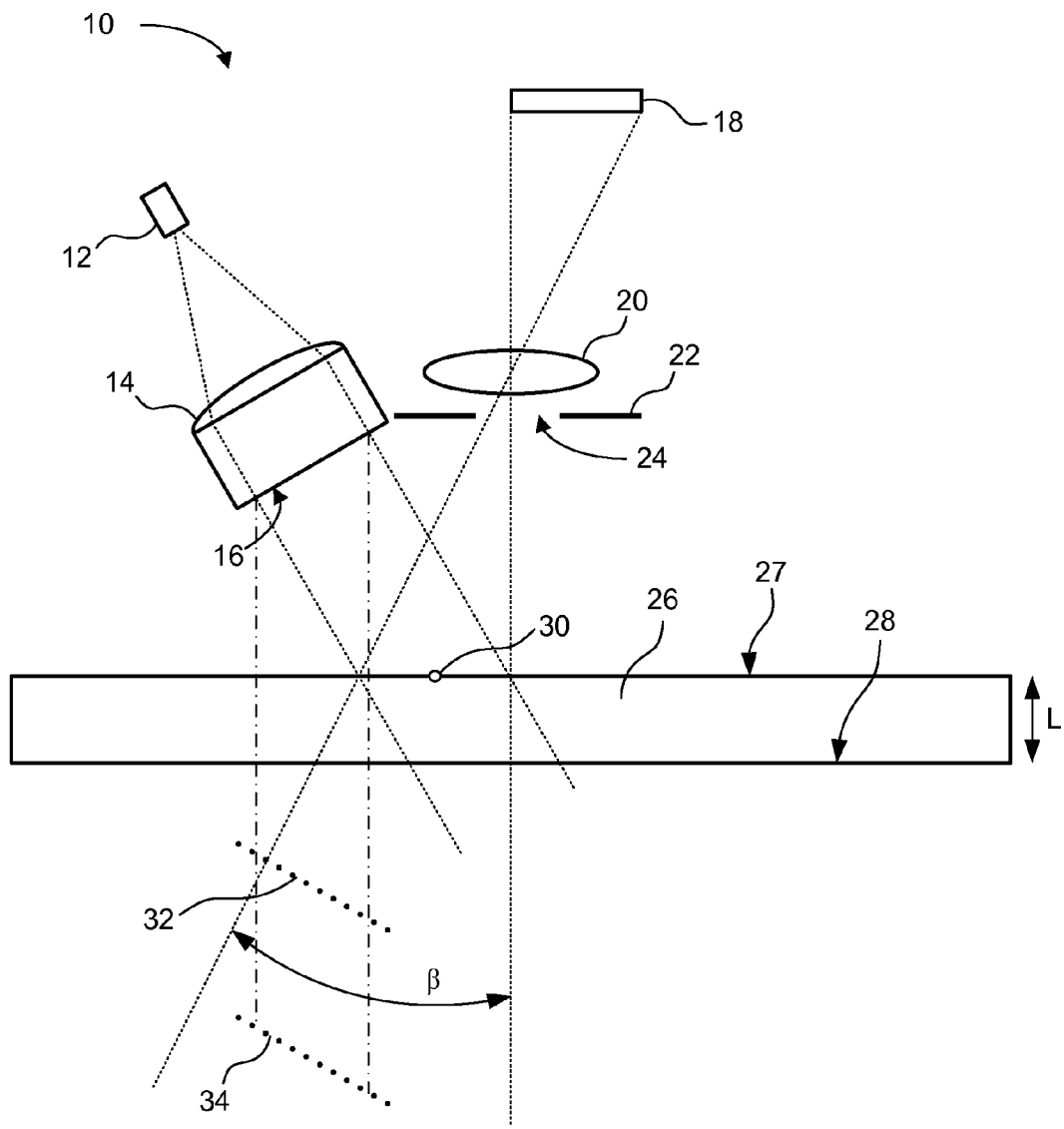
FIG. 1A depicts a schematic diagram of a conventional optical navigation device.
Figure 1B:
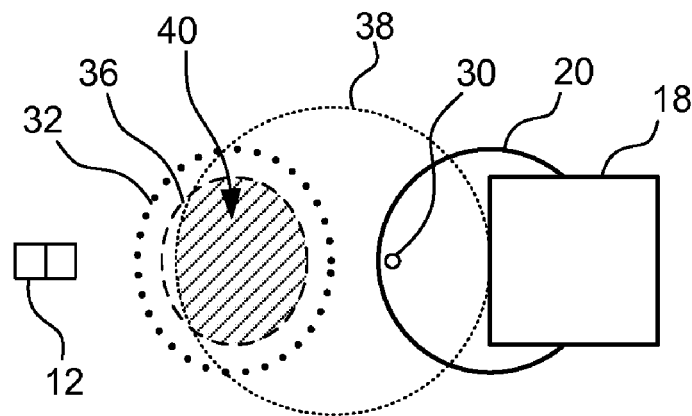
FIG. 1B depicts a top view of the field of view of the conventional optical navigation device of FIG. 1A at approximately the primary image corresponding to the primary surface of the tracking material.
Figure 1C:
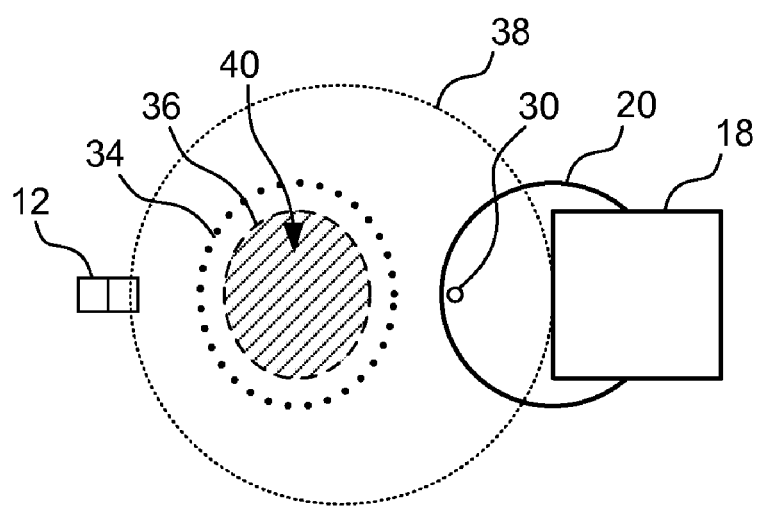
FIG. 1C depicts a top view of the field of view of the conventional optical navigation device of FIG. 1A at approximately the secondary image corresponding to the secondary surface of the tracking material.

It will be readily understood that the components of the embodiments as generally described herein and illustrated in the appended figures could be arranged and designed in a wide variety of different configurations. Thus, the following more detailed description of various embodiments, as represented in the figures, is not intended to limit the scope of the present disclosure, but is merely representative of various embodiments. While the various aspects of the embodiments are presented in drawings, the drawings are not necessarily drawn to scale unless specifically indicated.

The present invention may be embodied in other specific forms without departing from its spirit or essential characteristics. The described embodiments are to be considered in all respects only as illustrative and not restrictive. The scope of the invention is, therefore, indicated by the appended claims rather than by this detailed description. All changes which come within the meaning and range of equivalency of the claims are to be embraced within their scope.

Reference throughout this specification to features, advantages, or similar language does not imply that all of the features and advantages that may be realized with the present invention should be or are in any single embodiment of the invention. Rather, language referring to the features and advantages is understood to mean that a specific feature, advantage, or characteristic described in connection with an embodiment is included in at least one embodiment of the present invention. Thus, discussions of the features and advantages, and similar language, throughout this specification may, but do not necessarily, refer to the same embodiment.

Furthermore, the described features, advantages, and characteristics of the invention may be combined in any suitable manner in one or more embodiments. One skilled in the relevant art will recognize, in light of the description herein, that the invention can be practiced without one or more of the specific features or advantages of a particular embodiment. In other instances, additional features and advantages may be recognized in certain embodiments that may not be present in all embodiments of the invention.

Reference throughout this specification to "one embodiment," "an embodiment," or similar language means that a particular feature, structure, or characteristic described in connection with the indicated embodiment is included in at least one embodiment of the present invention. Thus, the phrases "in one embodiment," "in an embodiment," and similar language throughout this specification may, but do not necessarily, all refer to the same embodiment.

While many embodiments are described herein, at least some of the described embodiments reduce or eliminate crosstalk sources below a level of a useful signal in an optical navigation device. In particular, some embodiments reduce or eliminate crosstalk caused by scattering from the output facets (e.g., due to surface roughness and/or the dust and dirt accumulation on those surfaces) of the illumination optics in an optical mouse designed for tracking on glass.

In one embodiment, the output surfaces are moved from conventional locations so that their images, relative to one or more reflective surfaces, are outside of the field of view of the image sensor. Specifically, to eliminate the crosstalk from the front surface of the glass, the front surface is treated as a mirror and the image of the output surfaces can be identified behind that mirror. In the design, the output surfaces are moved in a way that the image falls outside the field of view of the image sensor.

In general, any change in the location of the output surfaces that moves the images of the output surfaces outside of the field of view of the image sensor can be used. More specifically, embodiments which employ different azimuth angles, zenith angles, and/or optical path distances may be used. One approach for locating the output surfaces, which has minimal effect on the other components of a typical optical mouse, is to keep the height (above the tracking surface) of the output surfaces fixed and move the output surfaces in a plane parallel to the navigation plane in a way that the zenith angles of the beam hitting the navigation surface are intact, while the azimuth angles are changed until the image of the output surface is outside of the field of view of the image sensor. Another approach is to change the location of the output surfaces in a way that the zenith and azimuth angles of the main beam hitting the navigation surface are kept constant (radial movement), while the distance from the output surfaces to the tracking surface is increased until the image of the output surface is outside of the field of view of the image sensor.

Using these new locations for the illumination optics reduces or eliminates the scattering light reflected from the glass surface at the navigation plane (e.g., the front surface) or the surface on the other side of the glass (e.g., the back surface) that ultimately arrives as crosstalk noise at the image sensor. Furthermore, some embodiments considerably reduce or eliminate the crosstalk light which originates from the output surfaces, scatters from a diffuse surface (e.g., a white paper) placed underneath the glass (e.g., in contact with the back surface of the glass), and finally reaches the image sensor.

In one embodiment, all of the multiple images of each output surface from various reflective surfaces may be located be outside of the field of the view of the image sensor. However, in some practical applications, it is sufficient to only move the two images of each output surface formed by mirrors at the front and back surfaces of the glass in a way that they fall outside the field of view of the image sensor. In practice, all the other images may have considerably lower power levels and may fall farther away from the glass surfaces, which decreases their contribution to the crosstalk. Furthermore, some embodiments also address other limitations such as excess lifting jitter and random motion in the lifted mode, for example, by laterally shifting the illuminated region of the diffuse reflecting surface placed underneath the navigation material 26. Shifting the illuminated region of the diffuse reflecting surface in this manner moves the illuminated region of the diffuse reflecting surface partially or completely out of the field of view of the image sensor 18.

Figure 2A:
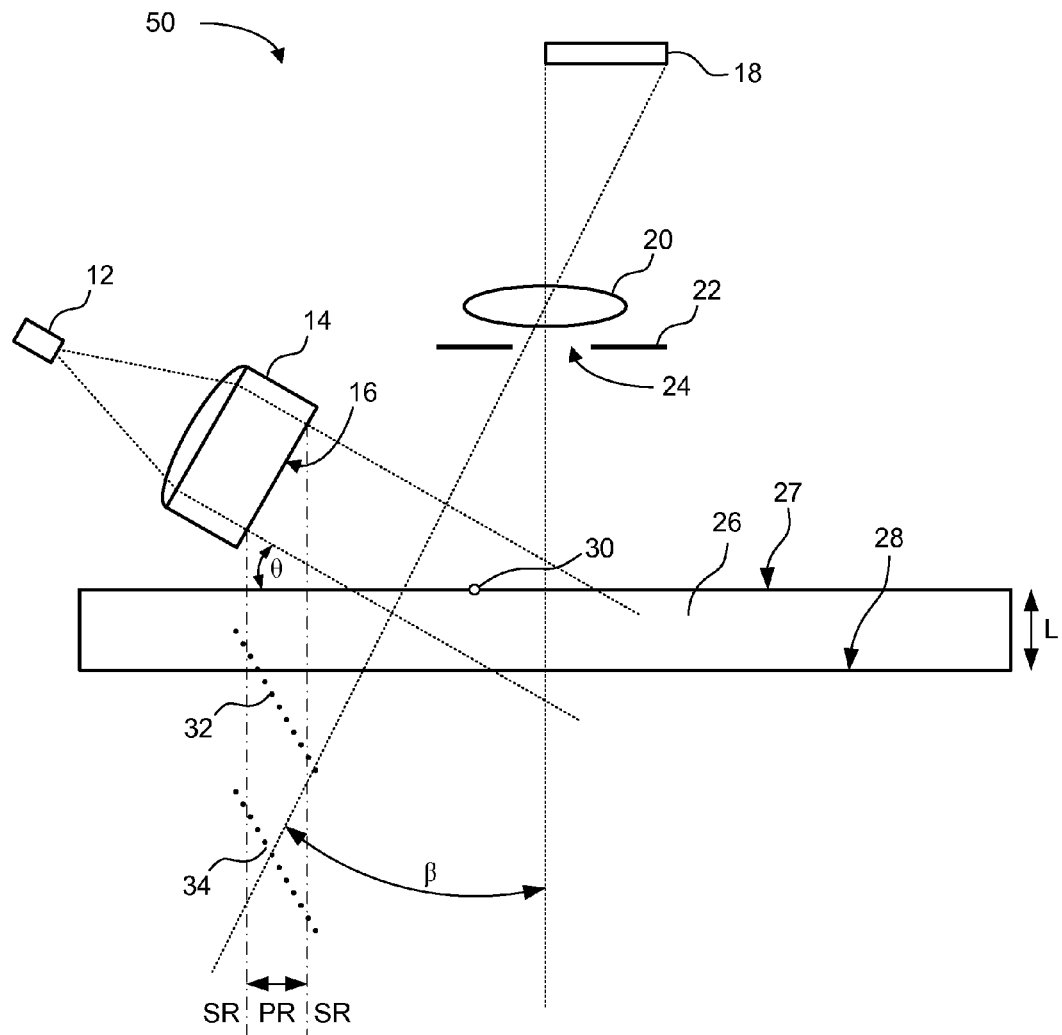
FIG. 2A depicts a schematic diagram of one embodiment of an optical navigation device in which the illumination optics are located so that the corresponding primary image and a large portion of the secondary image are outside of the field of view of the image sensor.

FIG. 2A depicts a schematic diagram of one embodiment of an optical navigation device 50 in which the illumination optics 14 are located so that the corresponding primary image 32 is outside of the field of view, β, of the image sensor 18. The illustrated optical navigation device 50 includes many of the same or similar components as the optical navigation device 10 of FIG. 1A. However, the differences in the arrangement of the components within the optical navigation device 50 of FIG. 2A have a significant impact on the performance of the optical navigation device 50, as explained herein. Additionally, it should be noted that although the optical navigation device 50 is shown and described with certain components and functionality, other embodiments of the optical navigation device 50 may include fewer or more components to implement less or more functionality.

The illumination optics 14 of the optical navigation device 50 are located at a much lower zenith angle, θ, relative to the origin 30, compared with the optical navigation device 10 of FIG. 1A. By locating the illumination optics 14 and, in particular, the output surface 16 in a position as shown, the image(s) formed corresponding to the output surface 16 can be located outside of the field of view of the image sensor 18.

The illustrated embodiment specifically shows two images 32 and 34 (shown as dotted lines) corresponding to the output surface 16 of the imaging optics 14. For reference, the first image 32 is referred to as the primary image 32 because it is the image formed by the reflective properties of the primary surface 27 (e.g., the top surface) of the tracking material 26.

The second image 34 is referred to as the secondary image 34 because it is the image formed by the reflective properties of the secondary surface 28 (e.g., the bottom surface) of the tracking material 26. Also, it should be noted that the illustrations are not necessarily drawn to scale. Additionally, the illustrated locations of the primary and secondary images 32 and 34 do not necessarily account for the effects of the refractive index, n, or thickness, L, of the tracking material 26. For example, if the tracking material 26 is glass, then the secondary image 34 may be formed closer to the secondary surface 28 of the tracking material. Consequently, in some of the illustrated embodiments, more of the secondary image 34 may be located outside of the field of view of the image sensor 18 than is shown.

For each of the images 32 and 34, there are at least two regions, PR and SR. The primary region, PR, corresponds to a region of the output surface 16 that is illuminated above a threshold intensity, TH. Conversely, the secondary region SR, corresponds to a region of the output surface 16 that is illuminated below the threshold intensity, TH. In one embodiment, the threshold intensity is the $1/e^2$ intensity level commonly used to characterize the diameter of optical beams. In another embodiment, the threshold intensity is a designated percentage (e.g., 0.1%) of the peak intensity level of the optical beam. Other embodiments may use other designations or conventions for the threshold intensity. Depending on the scattering level from the roughness of the output surface 16 and the signal amplitude from the desired features, the threshold intensity below which crosstalk is acceptable will vary.

In the illustrated embodiment, the primary region of the primary image 32 is completely outside of the field of view of the image sensor 18. In other words, the primary region of the primary image 32 is excluded from the field of view of the image sensor 18. However, the secondary region of the primary image 32 is partially inside the field of view of the image sensor 18. Although a portion of the secondary region of the primary image 32 is inside the field of view of the image sensor 18, the intensity of the secondary region is low enough that it does not contribute a significant amount of crosstalk in the images generated by the image sensor 18. In other embodiments, the secondary region of the primary image 32 also may be excluded from the field of view of the image sensor 18.

In contrast to the primary image 32, the secondary image 34 has portions of both the primary and secondary regions inside the field of view of the image sensor 18. However, in some embodiments, the effective intensity of the secondary image 34 is much less than the effective intensity of the primary image 32, so it may be acceptable in some circumstances to allow the image sensor 18 to generate images which include some of the primary region of the secondary image 34. In other embodiment, though, the primary region of the secondary image 34 is completely excluded from the field of view of the image sensor 18. Additionally, the secondary region of the secondary image 34 may be completely excluded from the field of view of the image sensor 18.

Figure 2B:
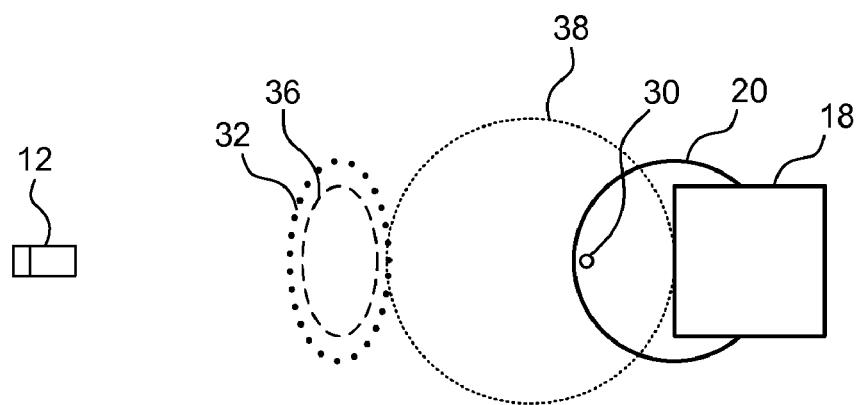
FIG. 2B depicts a top view of the field of view of the optical navigation device of FIG. 2A at approximately the primary image corresponding to the primary surface of the tracking material.

FIG. 2B depicts a top view of the field of view 38 of the optical navigation device 50 of FIG. 2A at approximately the primary image 32 corresponding to the primary surface 27 of the tracking material 26. This illustration shows the approximate location of the primary image 32 relative to the corresponding field of view 38 of the image sensor 18. For reference, the primary region 36 (shown dashed) indicates the region of the output surface that is illuminated above the threshold intensity. The annular region surrounding the primary region 36 is the secondary region corresponding to the portion of the output surface that is illuminated below the threshold intensity. From this top view, it can be seen that the primary region 36 is excluded from the field of view 38 of the image sensor 18, and there is slight overlap between the secondary region and the field of view 38 of the image sensor 18.

Figure 3:
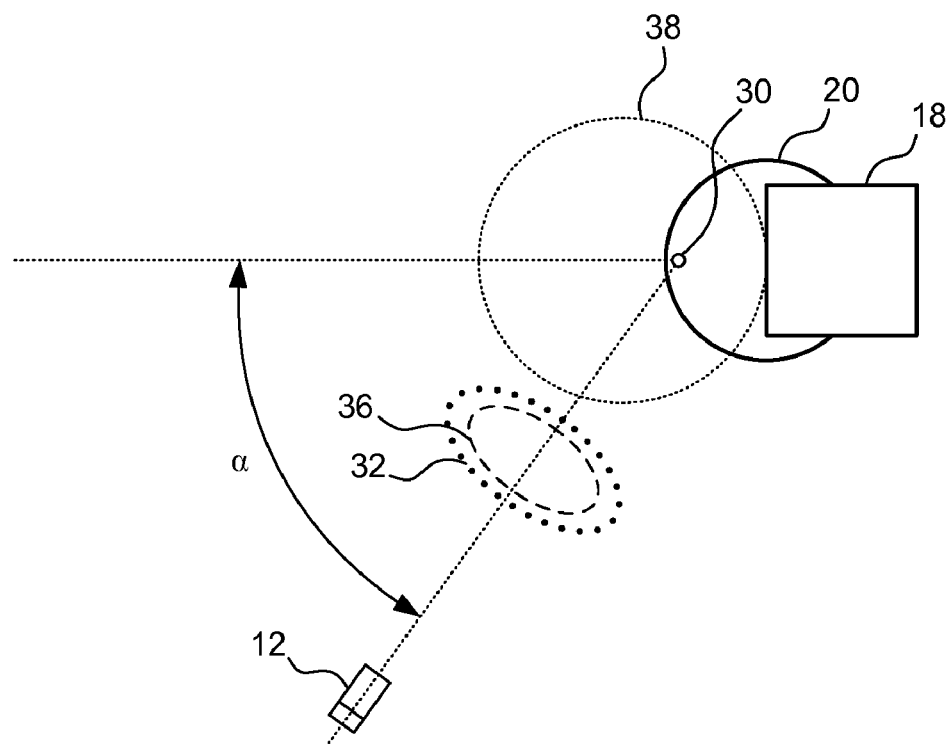
FIG. 3 depicts a top view of the field of view of another embodiment of the optical navigation device of FIG. 2A with a different azimuth angle relative to the origin of the field of view of the image sensor.

FIG. 3 depicts a top view of the field of view of another embodiment of the optical navigation device 50 of FIG. 2A with a different azimuth angle, α, relative to the origin 30 of the field of view, β, of the image sensor 18. In this embodiment, the primary region 36 and the secondary region are both excluded from the field of view 38 of the image sensor 18. Similarly, the primary region 36 and the secondary region of a corresponding secondary image 34 (not shown in FIG. 3) may be excluded from the field of view 38 of the image sensor 18. The difference in the location of the primary images 32 of FIGS. 2B and 3 results from a corresponding change in the location of the illumination optics 14 and, more specifically, the output surface 16 of the illumination optics 14.

In the illustrated embodiment, both the zenith and azimuth angles are different from the conventional embodiment of FIG. 1A. However, in other embodiments, only the zenith angle or only the azimuth angle is changed relative to the reference position shown in FIG. 1A, while the other angle is not changed. Additionally, it should be noted that the light source 12 may or may not be rotated to the same extent, or at all, as the illumination optics 14.

Figure 4:
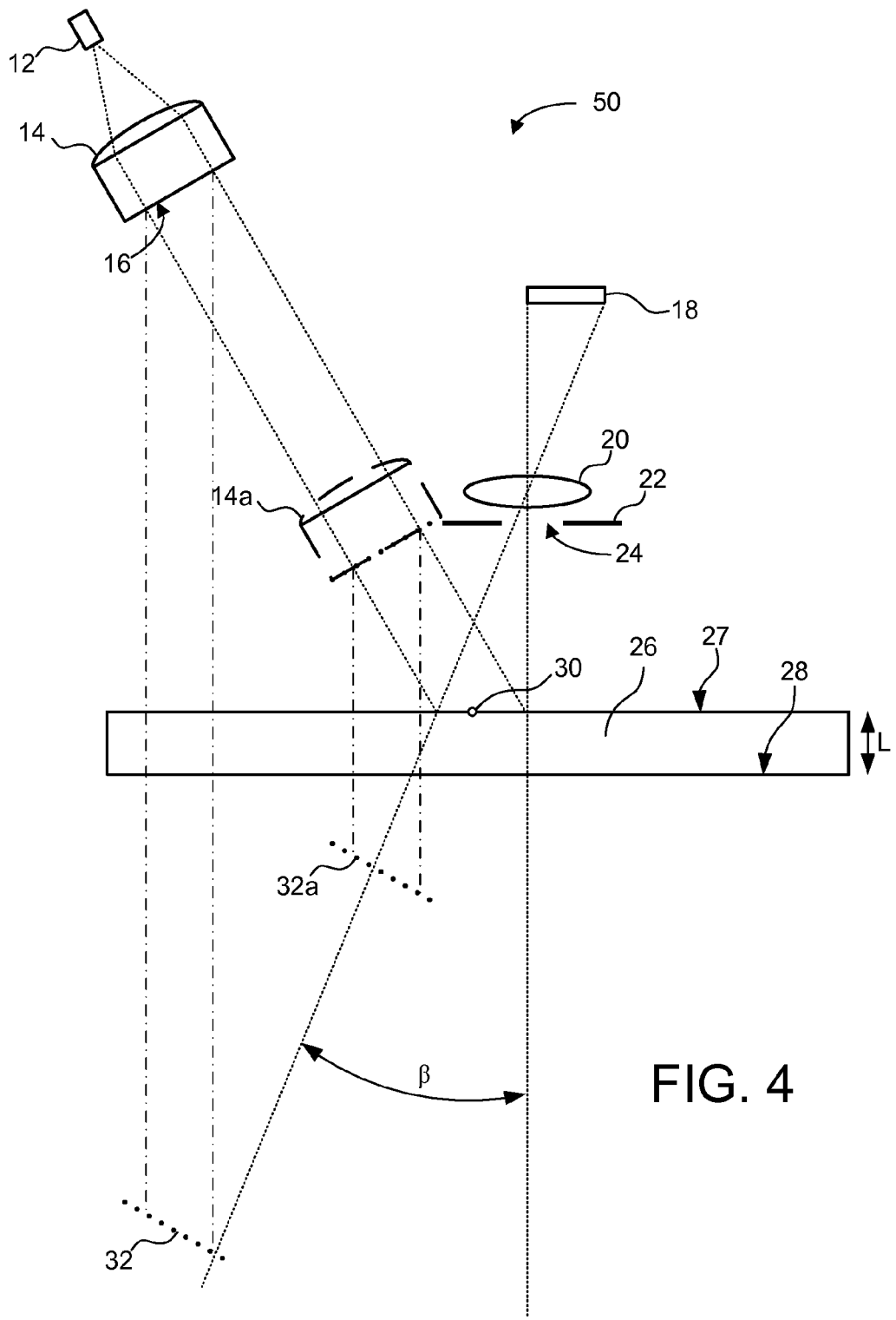
FIG. 4 depicts a schematic diagram of another embodiment of an optical navigation device in which the illumination optics are located along a standard zenith angle, but at a farther distance relative to the origin of the image sensor at the primary surface of the tracking material, so that the corresponding primary image is outside of the field of view of the image sensor.

FIG. 4 depicts a schematic diagram of another embodiment of an optical navigation device 50 in which the illumination optics 14 are located along a standard zenith angle, but at a farther distance relative to the origin 30 of the image sensor 18 at the primary surface 27 of the tracking material 26. As a result, the primary region of the corresponding primary image 32 is outside of the field of view of the image sensor 18. For comparison, hypothetical illumination optics 14a are shown (dashed) at a reference position that is much closer to the origin 30 of the field of view of the image sensor 18. A corresponding hypothetical primary image 32a is shown with a portion of the primary region inside of the field of view of the image sensor 18. Thus, at least in some embodiments, increasing the distance of the optical path between the illumination optics 14 and the origin 30 effectively moves the primary image 32 out of the field of view of the image sensor 18. It should be noted that since the image 32 of the output surface 16 is fixed in size, moving the image 32 further away from the image sensor 18 reduces the effective intensity of the crosstalk (if any) as well. Thus, the secondary region or a small portion of the primary region might be tolerated to be present in the field of view when the output surface 16 is farther away from the origin 30.

Figure 5:
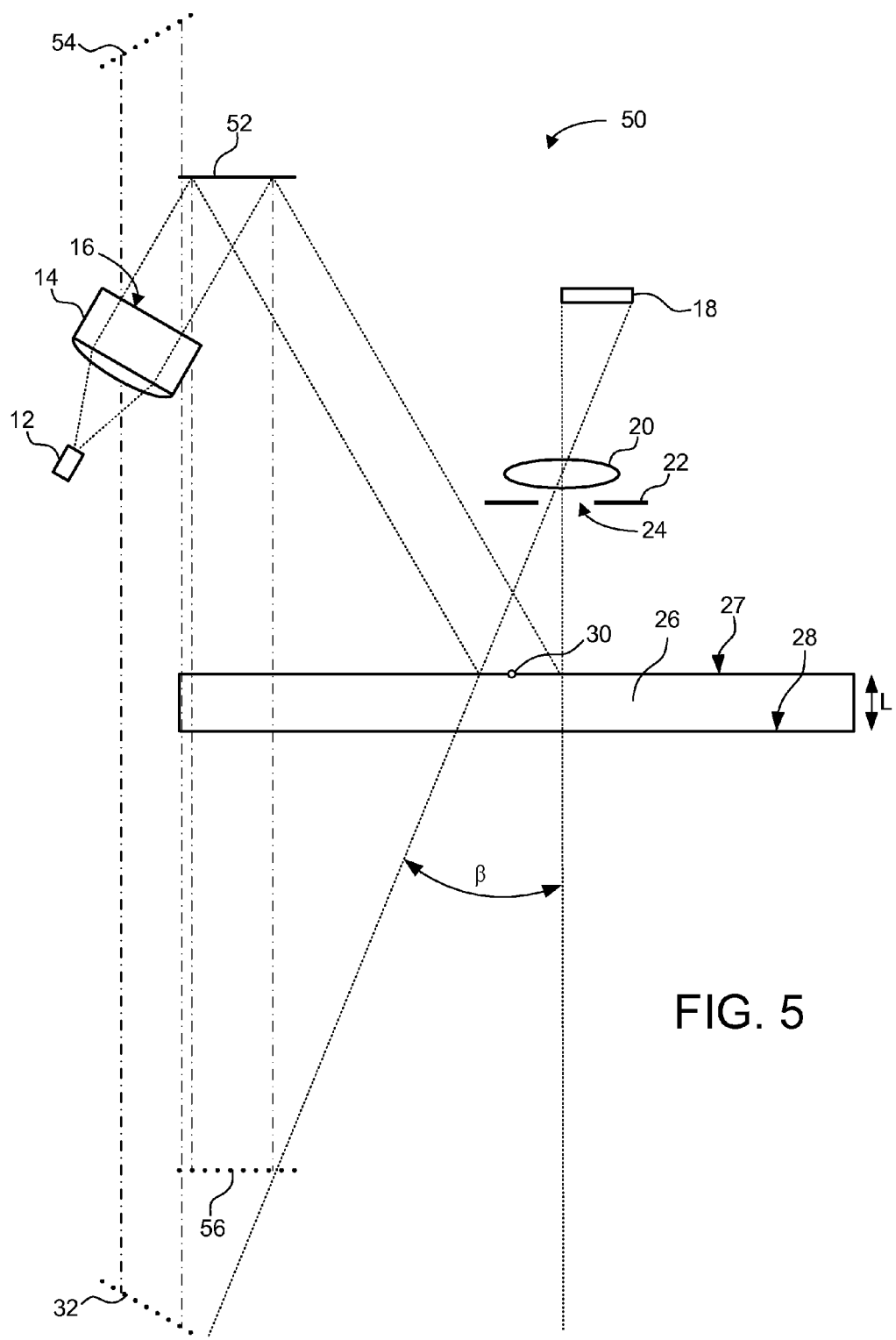
FIG. 5 depicts a schematic diagram of another embodiment of the optical navigation device of FIG. 4 which includes an additional illumination element.

FIG. 5 depicts a schematic diagram of another embodiment of the optical navigation device 50 of FIG. 4 which includes an additional illumination element 52. In one embodiment, the additional illumination element 52 is a mirror. Other embodiments may include different types of additional optical elements. By using the mirror 52, the optical path between the illumination optics 14 and the origin 30 can be increased without necessarily increasing the overall size of the optical navigation device 50 by a corresponding amount. For reference, the illumination optics 14 may include a primary optical element (i.e., a lens) that directs the light toward the mirror 52, and the mirror 52 may be designated as a secondary optical element to redirect the light toward the tracking surface 27.

In some embodiments, using one or more additional illumination elements such as the mirror 52 may introduce additional optical images. In the illustrated embodiment, another image 54 of the output surface 16 is formed relative to the mirror 52. Additionally, an image 56 of the surface of the mirror 52 is formed relative to the tracking surface 27. Other images also may be formed relative to other surface and/or interfaces. The impact that each of these images might have on the quality of the images generated by the image sensor 18 depends on the location and/or orientation of each optical element to determine how much, if any, of the primary and/or secondary regions of each image might be included in or excluded from the field of view of the image sensor 18. Other embodiments may use other quantities and/or arrangements of various optical elements, including mirrors, lenses, and so forth.

Figure 6:
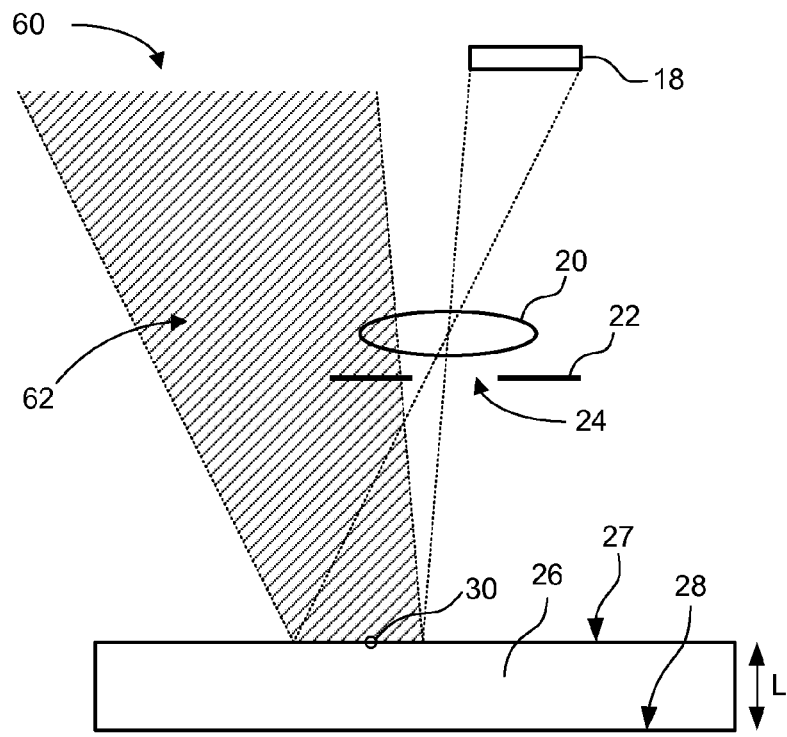
FIG. 6 depicts a schematic diagram of another embodiment of an optical navigation device with a first region which is exclusive of the illumination optics so that the corresponding primary image is outside of the field of view of the image sensor.
Figure 7:
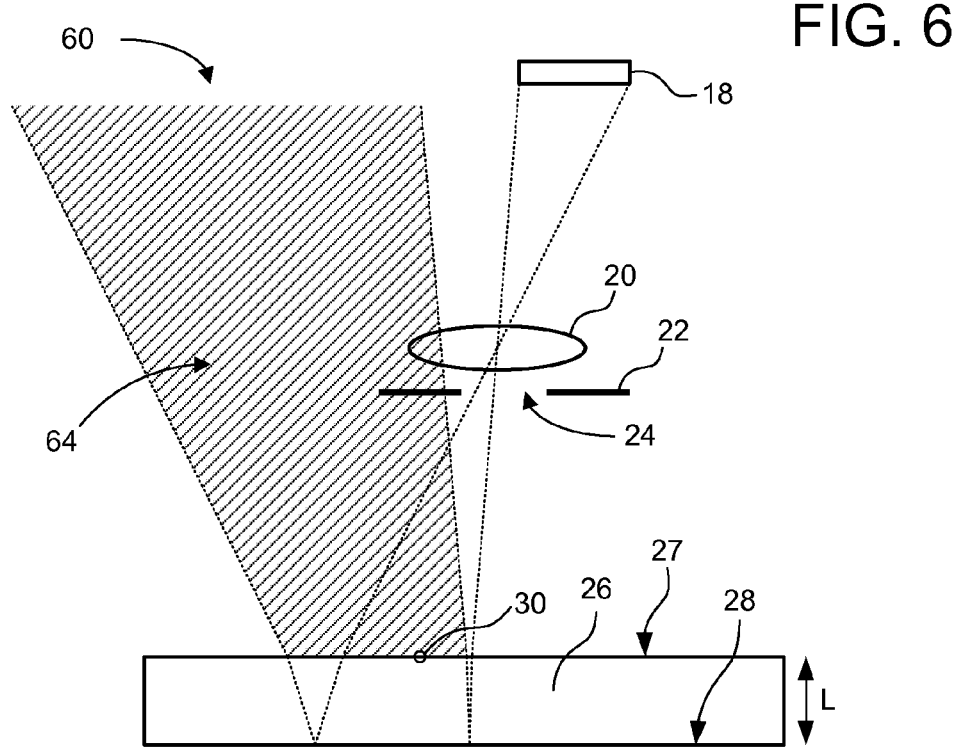
FIG. 7 depicts a schematic diagram of another embodiment of an optical navigation device with a second region which is exclusive of the illumination optics so that the corresponding secondary image is outside of the field of view of the image sensor.

FIG. 6 depicts a schematic diagram of another embodiment of an optical navigation device 60 with a first region 62 which is exclusive of the illumination optics 14 so that the corresponding primary image 32 is outside of the field of view of the image sensor 18. FIG. 7 depicts a schematic diagram of another embodiment of an optical navigation device 60 with a second region 64 which is exclusive of the illumination optics 14 so that the corresponding secondary image 34 is outside of the field of view of the image sensor 18. For reference, the first and second regions 62 and 64 may be designated as restricted regions 62 and 64. In both of these embodiments, by placing the illumination optics 14 (refer to previous figures) outside of the restricted regions 62 and 64, corresponding images will also be located outside of the field of view of the image sensor 18. Thus, the visualization of the restricted regions 62 and 64 may be useful to designers in locating the illumination optics 14 at adequate locations.

Figure 8:
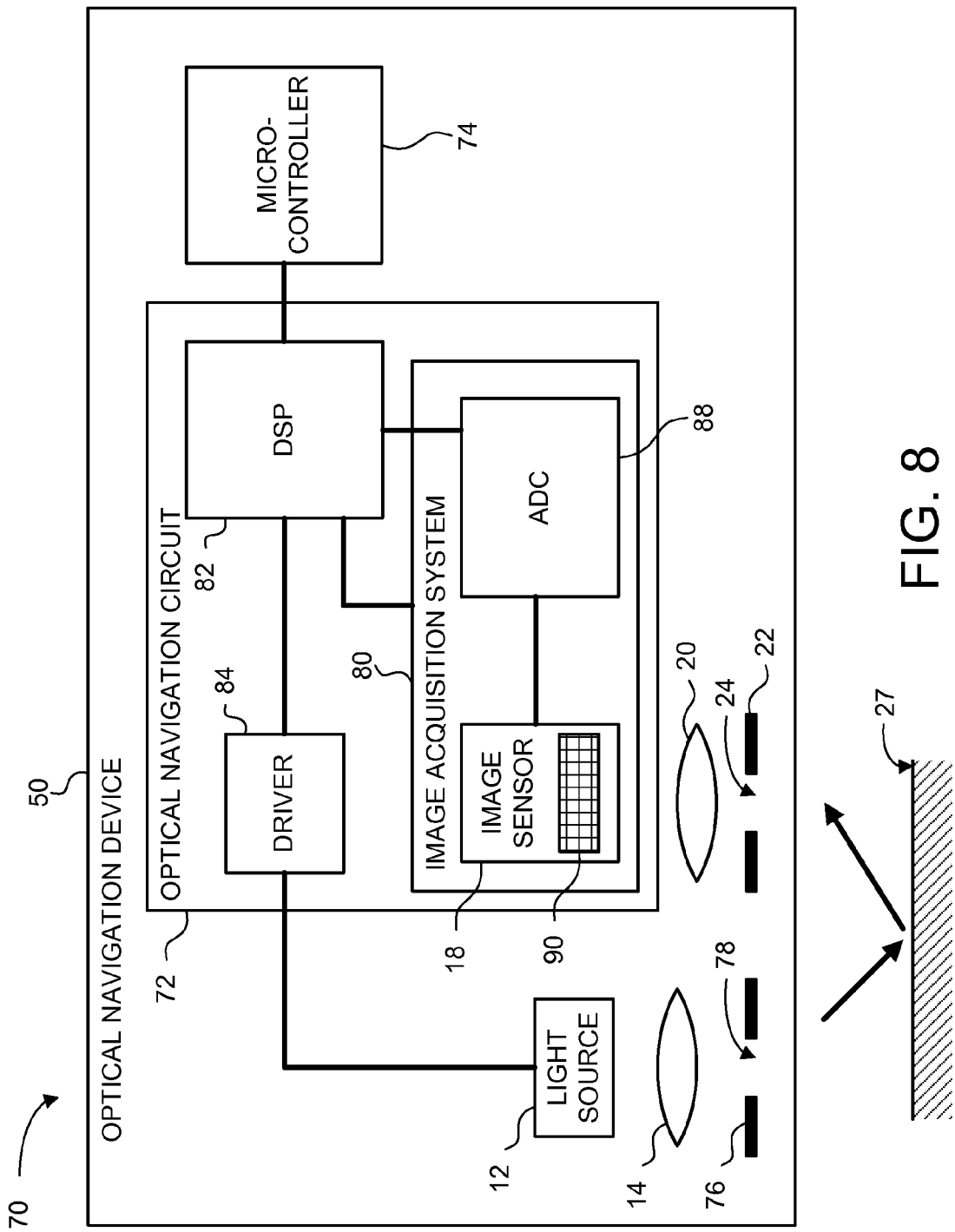
FIG. 8 depicts a schematic block diagram of one embodiment of an optical navigation system for generating navigation signals based on the images from the image sensor.

FIG. 8 depicts a schematic block diagram of one embodiment of an optical navigation system 70. The illustrated optical navigation system 70 includes the optical navigation device 50 and the tracking surface 27. In general, the optical navigation device 50 illuminates portions of the tracking surface 27 in order to generate navigation images of the illuminated portions or features at the tracking surface 27. Hence, the tracking surface 27 also may be referred to as an illumination surface. More specifically, the optical navigation device 50 moves relative to the tracking surface 27 and generates one or more navigation signals representative of the movement of the optical navigation device 50 relative to the tracking surface 27. Hence, the tracking surface 27 also may be referred to as a navigation surface.

In order to illuminate the tracking surface 27, the optical navigation device 50 emits a light beam, which is at least partially reflected by the tracking surface 27. The optical navigation device 50 detects the reflected light beam and processes the reflected light beam to generate the navigation signals. Examples of how the navigation signals may be generated are described in more detail below.

The tracking surface 27 may be any type of surface and may include one or more types of material compositions. Examples of typical tracking surfaces 27 include wood, stone, or plastic laminate desktops, as well as fabric or other textured navigation pads (e.g., a mouse pad). Some types of tracking surfaces 27 are highly specular so that substantially a relatively large portion of the light incident on the tracking surface 27 is specularly reflected and not diffusely scattered in other directions. One example of a highly specular tracking surface 27 is a glass surface. Other embodiments may include other types of specular tracking surfaces.

The distance between the optical navigation device 50 and the tracking surface 27 may vary depending on the application for which the optical navigation device 50 is used. In surface navigation applications, the optical navigation device 50 may be relatively close to the tracking surface 27. For example, a housing (not shown) of the optical navigation device 50 may be in direct, physical contact with the tracking surface 27. Alternatively, stand-off structures (not shown) attached to the housing of the optical navigation device 50 may be in direct, physical contact with the tracking surface 27. In other embodiments, the optical navigation device 50 may be within a few centimeters or inches of the tracking surface 27, without being in direct, physical contact with the tracking surface 27.

The depicted optical navigation device 50 includes the light source 12, an optical navigation circuit 72, and a microcontroller 74. The optical navigation device 50 also includes the illumination optical elements 14, an illumination aperture structure 76 which defines an illumination aperture 78, the imaging optical elements 20, and the imaging aperture structure 22 which defines the imaging aperture 24. Other embodiments may include fewer or more components. For example, some embodiments of the optical navigation device 50 may exclude one or more of the optical elements 14 or 20 and the aperture structures 76 or 22.

In one embodiment, the light source 12 is a light emitting diode (LED). In another embodiment, the light source 12 is a laser. For example, the light source 12 may be a vertical cavity surface emitting laser (VCSEL). Alternatively, the light source 12 may be another type of laser or other light source.

In general, the light source 12 directs a light beam toward the tracking surface 27 to illuminate a primary illumination spot at the tracking surface 27. If the tracking surface 27 is substantially specular, then the light beam reflects off of the tracking surface 27 along a specular reflection path. The incident light beam (i.e., the light traveling toward the tracking surface 27) may pass through the optical element 14 and the illumination aperture 78 formed by the illumination aperture structure 76. Similarly, the reflected light beam (i.e., the light reflected from the tracking surface 27) may pass through the imaging aperture 24, formed by the imaging aperture structure 22, and then pass through the optical element 20, as described above.

If there are any surface features such as dust or scratches at the navigation surface 27, then some of the incident light may be reflected and scattered along one or more scattered light paths, which are offset from the specular reflection path. Essentially, any path that is not the specular reflection path may be considered a scattered light path. In the case of diffuse reflections off of a surface feature, the reflected light may be diffused, or scattered, in substantially all directions. Although there may be many types of surface features which scatter the reflected light in different directions, some examples of surface features include particles (e.g., dust) on the tracking surface 27, aberrations (e.g., scratches) in the tracking surface 27, texture of the tracking surface 27, as well as imperfections below or beneath the tracking surface 27.

The depicted optical navigation circuit 72 includes an image acquisition system (IAS) 80, a digital signal processor (DSP) 82, and a driver 84. In one embodiment, the driver 84 of the optical navigation circuit 72 controls the operation of the light source 12 (e.g., using a driver signal) to generate the light beam that is emitted toward the tracking surface 27. The reflected light beam, or a portion thereof, or just the scattered light, is then received by the image acquisition system 80.

The depicted image acquisition system 80 includes the image sensor 18 and an analog-to-digital converter (ADC) 88. The image sensor 18 includes a pixel array 90. In one embodiment, the image sensor 18 generates a plurality of electrical signals corresponding to reflected light at the pixel array 90. Each of the electrical signals corresponds to one of the picture elements (or pixels) of the pixel array 90. In one embodiment, each pixel is a photosensor or other photosensitive device. At least a portion of the light beam reflected or scattered from the tracking surface 27 is incident on the pixel array 90. In one embodiment, the imaging optical element 20 facilitates resolution of microscopic surface images at the pixel array 90. Alternatively, the imaging optical element 20 facilitates resolution of more distant objects in a free space navigation environment.

The analog-to-digital converter (ADC) 88 converts the plurality of electrical signals, received from the pixel array 90 of the navigation sensor 18, from analog signals to digital signals. The analog-to-digital converter 88 then passes the digital signals to the digital signal processor 82.

After the digital signal processor 82 receives the digital form of the electrical signals from the analog-to-digital converter 88 of the image acquisition system 80, the digital signal processor 82 may perform additional processing using the digital signals. The digital signal processor 82 then transmits one or more signals to the microcontroller 74. Examples of types of signals transmitted from the digital signal processor 82 of the optical navigation circuit 72 to the microcontroller 74 include channel quadrature signals based on $\Delta x$ and $\Delta y$ relative displacement values. These signals, or other signals, may be indicative of a movement of the optical navigation device 50 relative to the tracking surface 27.

Figure 9:
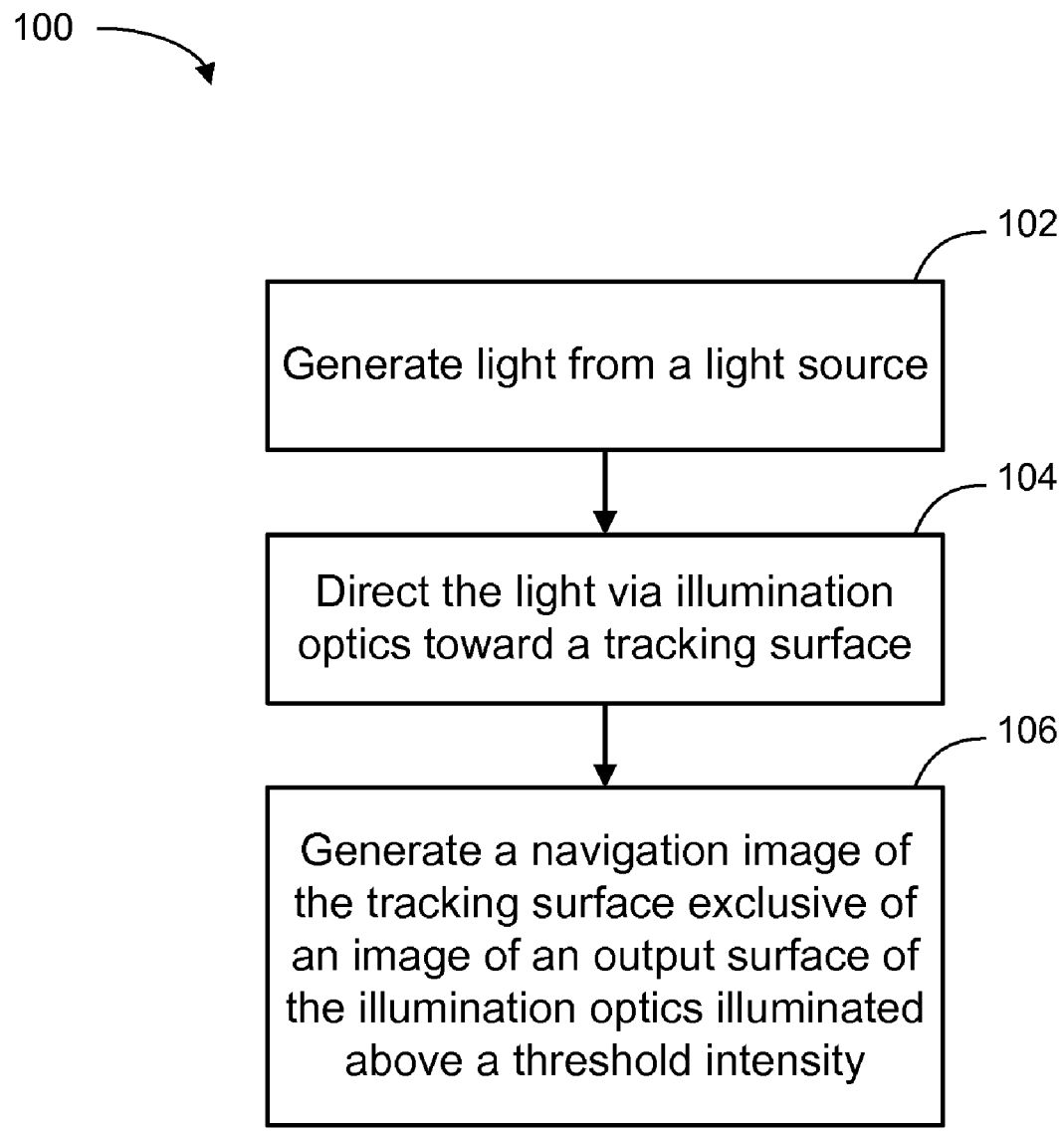
FIG. 9 depicts a flow chart diagram of one embodiment of a method for operating an optical navigation device so that at least one image of the illumination optics is outside of the field of view of the image sensor.

FIG. 9 depicts a flow chart diagram of one embodiment of a method 100 for making an optical navigation device 50 so that at least one image of the illumination optics 14 is outside of the field of view of the image sensor 18. Although the method 100 is described in conjunction with the optical navigation device 50 of FIG. 2A, embodiments of the method 100 may be implemented with other types of optical navigation devices.

At block 102, the light source 12 generates light. At block 104, the illumination optics 14 direct the light toward the tracking surface 27. As explained above, the illumination optics 14 may facilitate relatively direct or indirect illumination of the tracking surface 27 by the light source 12. At block 106, the image sensor 18 generates a navigation image of the tracking surface 27, and the navigation image excludes an image (e.g., one or more of the images 32 and 34) of the output surface 16 of the illumination optics 14. More specifically, the navigation image excludes at least the primary region of a primary image 32 relative to the tracking surface 27. In this way, the crosstalk from the image(s) of the output surface 16 of the illumination optics 14 is substantially reduced or eliminated to facilitate better navigation of the optical navigation device 50. The depicted method 100 then ends.

It should be noted that in at least some of the above mentioned embodiments, a combination of measure may be implemented to reduce or eliminate the crosstalk from the image(s) of the output surfaces 16 of the illumination optics 14. In addition to some of the measure described above, other embodiments may use a light source 12, illumination optics 14, and/or an illumination aperture 78 to produce an incident light beam with a modified cross-sectional geometry so that predictable portions of the output surfaces 16 may be illuminated above the threshold intensity. For example, a Gaussian beam with an elliptical cross-section corresponding to the primary region illuminated above the threshold intensity may be implemented, and the image of that elliptical primary region may be outside of the field of view of the image sensor 18. Thus, in some embodiments, the cross-sectional geometry of the light beam on the output surfaces 16 may be engineered in a way that the corresponding images (e.g., the images 32 and 34) are outside of the field of view of the image sensor 18. One example of such engineering includes changing in the ellipticity of the beam cross section at the output surfaces 16 in a way that their images are outside the field of view of the image sensor 18. One example of imaging optics that are capable of changing the optical cross-sectional geometry of a beam is illustrated and described in U.S. patent application Ser. No. 12/391,439, filed Feb. 24, 2009, which is herein incorporated by reference in its entirety. Other embodiments may use other optical elements to change the cross section of the beam at the output surfaces 16.

In the above description, specific details of various embodiments are provided. However, some embodiments may be practiced with less than all of these specific details. In other instances, certain methods, procedures, components, structures, and/or functions are described in no more detail than to enable the various embodiments of the invention, for the sake of brevity and clarity.

Although the operations of the method(s) herein are shown and described in a particular order, the order of the operations of each method may be altered so that certain operations may be performed in an inverse order or so that certain operations may be performed, at least in part, concurrently with other operations. In another embodiment, instructions or sub-operations of distinct operations may be implemented in an intermittent and/or alternating manner.

Although specific embodiments of the invention have been described and illustrated, the invention is not to be limited to the specific forms or arrangements of parts so described and illustrated. The scope of the invention is to be defined by the claims appended hereto and their equivalents.

What is claimed is:

1. An optical navigation device comprising:
    an image sensor to generate images of a tracking surface, wherein the image sensor has a field of view via imaging optics interposed between the image sensor and the tracking surface;
    a light source to generate light to illuminate a portion of the tracking surface; and
    illumination optics interposed between the light source and the tracking surface to direct the light from the light source toward the tracking surface, wherein the illumination optics comprise an output surface with a primary region of the output surface illuminated above a threshold intensity, wherein a primary direction of propagation of the light from the output surface of the illumination optics is the same as a primary direction of propagation of the light into the illumination optics;
    wherein the illumination optics are located relative to the tracking surface so that, during a navigation mode, a mirror image of the output surface, relative to the tracking surface, is located to exclude the primary region from the field of view of the image sensor.

2. The optical navigation device of claim 1, wherein the tracking surface is a primary interface of a tracking material, and the tracking material comprises a secondary interface opposite the primary interface, wherein the illumination optics are located relative to the primary interface so that a corresponding primary image of the output surface is located to exclude the primary region from the field of view of the image sensor.

3. The optical navigation device of claim 2, wherein the illumination optics are further located relative to the secondary interface so that a corresponding secondary image of the output surface is located to exclude the primary region outside of the field of view of the image sensor.

4. The optical navigation device of claim 1, wherein a secondary region of the output surface is illuminated below the threshold intensity, wherein the illumination optics are further located relative to the tracking surface so that the image of the output surface is located to include at least a portion of the secondary region within the field of view of the image sensor.

5. The optical navigation device of claim 1, wherein the illumination optics comprise an optical lens and the output surface comprises an exit surface of the optical lens, wherein the optical lens is located at a position defined by a zenith angle, an azimuth angle, and a distance relative to a reference origin approximately at a center of the field of view at the tracking surface.

6. The optical navigation device of claim 5, wherein the position of the optical lens is relative to a reference position, which varies from the position of the optical lens by a change in only the zenith angle, wherein placement of the optical lens at the reference position would render an image of the primary region at least partially inside of the field of view of the image sensor.

7. The optical navigation device of claim 5, wherein the position of the optical lens is relative to a reference position, which varies from the position of the optical lens by a change in only the azimuth angle, wherein placement of the optical lens at the reference position would render an image of the primary region at least partially inside of the field of view of the image sensor.

8. The optical navigation device of claim 5, wherein the position of the optical lens is relative to a reference position, which varies from the position of the optical lens by a change in only the distance relative to the reference origin, wherein placement of the optical lens at the reference position would render an image of the primary region at least partially inside of the field of view of the image sensor.

9. The optical navigation device of claim 1, wherein the illumination optics comprise:
    a primary optical element to direct the light in a first direction substantially away from the tracking surface, wherein a primary region of the primary optical element is illuminated above the threshold intensity; and
    a secondary optical element to redirect the light from the first direction to a second direction substantially toward the tracking surface, wherein a primary region of the secondary optical element is illuminated above the threshold intensity.

10. The optical navigation device of claim 9, wherein the primary optical element is located relative to the tracking surface so that an image of the primary optical element is located to exclude the primary region of the primary optical element from the field of view of the image sensor.

11. The optical navigation device of claim 10, wherein the secondary optical element is located relative to the tracking surface so that an image of the secondary optical element is located to exclude the primary region of the secondary optical element from the field of view of the image sensor.

12. An optical navigation device comprising:
    an image sensor to generate images of a tracking surface, wherein the image sensor has a field of view inclusive of at least a portion of the tracking surface, wherein a restricted region reflecting away from the tracking surface substantially corresponds to the field of view of the image sensor; and
    illumination optics to direct light from a light source toward the tracking surface, wherein a primary region of an illuminated output surface is illuminated above a threshold intensity, wherein a primary direction of propagation of the light from the output surface of the illumination optics is the same as a primary direction of propagation of the light into the illumination optics, and the primary region of the illuminated output surface located outside of the restricted region so that, during a navigation mode, a mirror image of the output surface relative to the tracking surface excludes the primary region from the field of view of the image sensor.

13. The optical navigation device of claim 12, wherein a secondary region of the output surface is illuminated below the threshold intensity, wherein the illumination optics are further located relative to the tracking surface so that the image of the output surface includes at least a portion of the secondary region within the field of view of the image sensor.

14. The optical navigation device of claim 12, wherein, relative to primary and secondary interfaces of a tracking material, corresponding primary and secondary images are located to exclude primary regions of the output surface illuminated above the threshold intensity from the field of view of the image sensor.

15. The optical navigation device of claim 12, further comprising imaging optics interposed between the image sensor and the tracking surface, wherein the imaging optics at least partially establish the field of view of the image sensor.

16. The optical navigation device of claim 12, wherein the illumination optics comprise:
  a primary optical element to direct the light in a first direction substantially away from the tracking surface, wherein a primary region of the primary optical element is illuminated above the threshold intensity; and
  a secondary optical element to redirect the light from the first direction to a second direction toward the tracking surface, wherein a primary region of the secondary optical element is illuminated above the threshold intensity;
  wherein the primary optical element is located relative to the tracking surface so that an image of the primary optical element is located to exclude the primary region of the primary optical element from the field of view of the image sensor.

17. The optical navigation device of claim 16, wherein the secondary optical element is located relative to the tracking surface so that an image of the secondary optical element is located to exclude the primary region of the secondary optical element from the field of view of the image sensor.

18. A method for operating an optical navigation device, the method comprising:
  generating light from a light source;
  directing the light via illumination optics toward a tracking surface, wherein the illumination optics comprise an output surface, wherein a primary region of the output surface is illuminated above a threshold intensity, wherein a primary direction of propagation of the light from the output surface of the illumination optics is the same as a primary direction of propagation of the light into the illumination optics; and
  using an image sensor to generate a navigation image of the tracking surface, wherein the image sensor has a field of view inclusive of the tracking surface;
  wherein the illumination optics are located relative to the tracking surface so that, during a navigation mode, a mirror image of the output surface, relative to the tracking surface, is located to exclude the primary region from the field of view of the image sensor.

19. The method of claim 18, wherein a secondary region of the output surface is illuminated below the threshold intensity, wherein the illumination optics are further located relative to the tracking surface so that the image of the output surface is located to include at least a portion of the secondary region within the field of view of the image sensor.

20. The method of claim 18, wherein the illumination optics are further located relative to the tracking surface and a secondary surface so that corresponding primary and secondary images exclude primary regions of the output surface illuminated above the threshold intensity from the field of view of the image sensor.

* * * * *